March 16, 1948. E. MONTAGNE 2,438,103
APPARATUS FOR REGULATING WATER STREAMS AND SAND CLEARING DEVICES
Filed Nov. 20, 1945
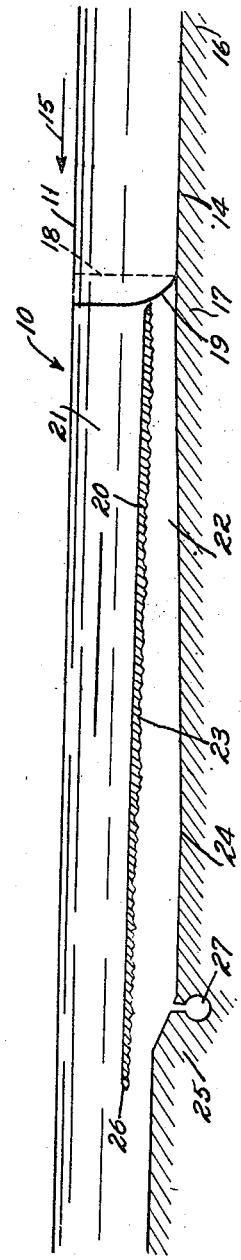
Fig.1.
Fig.2.
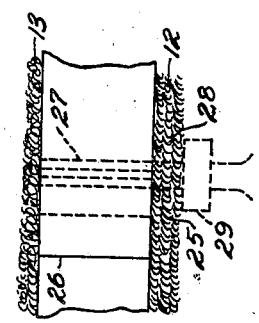
INVENTOR
Elisée Montagné
by: John H Graham
HIS AGENT.

Patented Mar. 16, 1948

2,438,103

UNITED STATES PATENT OFFICE 2,438,103

APPARATUS FOR REGULATING WATER STREAMS AND SAND CLEARING DEVICES

Elisée Montagné, Saint-Girons, France, assignor to Societe L'Entreprise Industrielle, Paris, France, a corporation of France Application November 20, 1945, Serial No. 629,826
In France July 9, 1941

Section 1, Public Law 690, August 8, 1946,
Patent expires October 23, 1964

11 Claims. (Cl. 61—1)

My invention relates in general to a means for precipitating solid matter from a constantly flowing stream of water or other liquid and more particularly to a means for accomplishing this purpose without settling pools, or straining screens or mechanical devices.

Although my invention may be used for clearing particles from any liquid flowing in a channel, it has its most common application in eliminating sand from water flowing in a stream bed so that the water delivered from the downstream end of a sand clearing means constructed in accordance with my invention will have a greater portion of sand removed from it. The water may be further cleared by filters or other devices if necessary but in many cases it may be sufficiently free of suspended matter to be used directly upon its emergence from the clearing device herein disclosed. Many sand clearing devices, filters, screens, for instance, become quickly clogged if the water carries large amounts of solid matter. The device herein disclosed, however, does not readily clog and accomplishes its function with a minimum reduction of flow velocity.

These objects are accomplished by means of a horizontal baffle plate of considerable length, which is supported in the stream at a critical depth and may be aided by various auxiliaries to be described in detail hereinafter.

It is known that in a channel which has substantially uniform cross section and gradient over considerable length so that substantially constant flow conditions are established, that the water near the bottom of the channel has a lower downstream velocity than that in the upper portion of the stream because of the frictional effect of irregularities in the surface of the bottom. This results in upwardly flowing current near the bottom of the stream which tends to maintain sand or other particles in suspension. These currents have been found to be as high as 30% of the horizontal velocity of the stream at a given point. The velocity of the water in the upper part of the stream has a downward component which is not of significant magnitude in an open channel but becomes substantial if the upper surface of the water is slowed by contact with a wall surface. Because of these ascending and descending currents, the sand tends to concentrate at a depth at which maximum horizontal velocity occurs. Thus in an open channel the horizontal velocity increases from a minimum to a value which is very nearly maximum at a depth which is a function of stream velocity, channel wall surface conditions; etc. Above this depth the horizontal velocity remains substantially constant. It is at this initial depth that I locate a horizontal baffle, preferably smooth on its upper surface and rough on its lower surface, to separate the stream into an upper comparatively sand free stratum and a lower stratum between the baffle and the channel bottom which carries the bulk of the sand. The gradient of the channel bottom is increased under the baffle and the lower stratum of the stream is slowed sufficiently to unburden it of most of its sand content. The major portion of the stream, however, flows above the baffle without having its velocity diminished to any substantial degree.

The details and operation of my invention will be further described in connection with the drawings in which:

Fig. 1 is a longitudinal vertical section of a channel incorporating my invention; and Fig. 2 is a plan view of a portion of the channel of Fig. 1.

In Fig. 1 a stream flowing in a channel is indicated generally by the numeral 10 and includes water (or other liquid) 11 flowing between side walls 12 and 13 (Fig. 2) and bottom 14. The direction of flow is indicated by arrow 15.

The first element of my invention is a length of channel, 16 and 17 of substantially constant cross section and gradient which is sufficiently long to cause the stream to assume constant flow conditions. The horizontal component of stream velocity at various depths is indicated by the horizontal distance of a corresponding point on curve 19 from base line 18. It will be noted that although curve 19 does not change sharply to a constant horizontal velocity in the upper part of the stream, nevertheless, there is a region above which the horizontal velocity is substantially constant, a region which may be located by means well known to those versed in the art of hydraulic engineering.

A horizontal baffle 20 is located in the stream at a depth in region 19 and extends from a substantial distance downstream. Baffle 20 thus divides the flowing water 11 into an upper stratum 21 and a lower stratum 22.

As pointed out in the introduction, the upper stratum 21 has a minimum of sand content while the lower stratum 22 has, because of the ascending currents in that part of the stream lying below the region 19 of maximum velocity, a much higher sand content.

The upper surface of baffle 20 is smooth in order to permit the unimpeded flow or upper stratum 21 but the lower surface is preferably characterized by a number of rough and irregular projections 23 which serve to slow the velocity of lower stratum 22.

Lower stratum 22 may be further decelerated by increasing the gradient of bottom 14 for a substantial distance, say from 17 to 24, under baffle 20. Near the downstream end of baffle 20, the bottom 14 preferably rises rather sharply as indicated at 25 to produce a stream cross section at the downstream end 26 of baffle 20 substantially the same as the stream cross section at the upstream end 17.

In order to facilitate the removal of sand deposited under baffle 20, I provide a transverse trench 27 in channel bottom 14 at substantially its lowest point under the downstream end of baffle 20. Trench 27 is provided at one end with an outlet 28 through bank 12 which may be opened when desired by means of a gate or valve indicated diagrammatically at 29 so that sand may be flushed from the trench 27 by the head of water existing above 11.

In this manner the sand will be precipitated and concentrated due to both the slowing down and the modification of the speed curve.

As shown in the drawing, the evacuation of the liquid carrying sand in suspension takes place through a transversal groove 27, the hydraulic output of which is regulated by a valve 29 that may be controlled either manually or automatically by the movement of the cleaning valve of the weir for the water withdrawal. This latter valve, being opened, more or less, depending on the degree of the swelling of the water and, consequently on the solid water delivery of the stream, the same will apply as regards the delivery of water charged with sand.

As is furthermore to be seen, the arrangement of the transverse evacuation trench 27 is such as to facilitate the evacuation. The channel bottom 14 is formed with a certain gradient below plate 20.

The length of the plate, the inclination of the channel and the trench 27 for the evacuation of the water cleared of sand, will be designed according to the depth of the water in the admission channel, the average flow velocity and the content of sand in the waterstream.

Dependent on the width of the admission channel, the horizontal plate 1 can be supported by one or more longitudinal walls which, at the same time, will cooperate in reducing the speed of flow of the water to be cleared.

If desired, a further evacuation groove (not shown) may be provided in addition to groove 27.

The arrangement according to the invention may be combined with any other known type of sand clearing device, such as a water collector with raised sill, orifices provided in the lower part of a longitudinal prismatic trench, excavated in the deepest part of the construction, etc.

It will finally be noted that the height or level at which the plate 20 is to be positioned may vary in accordance with the length of the channel and the particular form of the speed curve.

What is claimed is:

1. Means for clearing suspended matter from a stream of liquid which means includes: walls forming a first channel section adapted to receive said stream, said first channel section having substantially constant cross section and gradient and having a length which is large relative to the cross sectional dimensions of said channel; walls forming a second channel section as a downstream continuation of said first channel section; and a substantially horizontal plate supported in said second channel section submerged in said flowing stream and adapted to separate said stream into an upper stratum and a lower stratum.

2. A combination as described in claim 1 in which said horizontal plate is located at a depth which is in the region at which the downstream velocity reaches a value substantially near the maximum.

3. A combination as described in claim 1 in which the lower surface of said horizontal plate has velocity reducing irregularities.

4. A combination as described in claim 1 in which for at least part of its length the bottom of said second channel section has a gradient increased over said first channel section and adapted to decelerate the lower stratum of said stream.

5. Means for clearing suspended matter from a stream of liquid, which means included: walls forming a first channel section adapted to receive said stream, said first channel section having substantially constant cross section and gradient and having a length which is large relative to the cross sectional dimensions of said channel; walls forming a second channel section as a downstream continuation of said first channel section, a substantially horizontal plate supported in said second channel section submerged in said flowing stream and adapted to separate said stream into an upper stratum and a lower stratum said plate being disposed at a level starting from which the speed curve forms a practically vertical tangent, and walls forming a depression in the bottom of said second channel section under said plate and adapted to temporarily decelerate said stream to produce precipitation of suspended matter.

6. Means for clearing suspended matter from a stream of liquid, which means include: walls forming a first channel section adapted to receive said stream, said first channel section having a substantially constant cross section and gradient and having a length which is large relative to the cross sectional dimensions of said channel; walls forming a second channel section as a downstream continuation of said first channel section, a substantially horizontal plate supported in said second channel section submerged in said flowing stream and adapted to separate said stream into an upper stratum and a lower stratum; walls forming a transverse trench in the bottom of said second channel portion under said plate near the downstream end thereof; and walls forming an outlet from said trench and adapted to permit the flushing of sand therefrom.

7. A combination as described in claim 6 in which for at least part of its length the bottom of said second channel section has a gradient increased over said first channel section and adapted to decelerate the lower stratum of said stream.

8. Means for clearing suspended matter from a stream of liquid, which means includes: walls forming a first channel section adapted to receive said stream, said first channel section having a substantially constant cross section and gradient and having a length which is large relative to the cross sectional dimensions of said channel; walls forming a second channel section as a downstream continuation of said first channel section, a substantially horizontal plate supported in said second channel section submerged in said flowing stream and adapted to separate said stream into an upper stratum and a lower stratum; walls forming a transverse trench in the bottom of said second channel portion under said plate near the downstream end thereof; walls forming in the bottom of said second channel section a passage of increasing cross section for said lower stratum for a substantial distance of the portion upstream from said trench and diminishing cross section area downstream from said trench; and walls forming an outlet from said trench and adapted to permit the flushing of sand therefrom.

9. Means for clearing suspended matter from a stream of liquid, which means includes: walls forming a first channel section adapted to receive said stream, said first channel section having a substantially constant cross section and gradient and having a length which is large relative to the cross sectional dimensions of said channel; walls forming a second channel section as a downstream continuation of said first channel section; a substantially horizontal plate supported in said second channel section submerged in said flowing stream and adapted to separate said stream into an upper stratum and a lower stratum; walls forming a transverse trench in the bottom of said second channel portion under said plate near the downstream end thereof; walls forming in the bottom of said second channel section a passage of increasing cross section for said lower stratum for a substantial distance of the portion upstream from said trench and diminishing cross section area downstream from said trench; walls forming an outlet from said trench and adapted to permit the flushing of sand therefrom; and valve means adapted to control flushing of said trench through said outlet.

10. Means for clearing suspended matter from a stream of liquid, which means includes: walls forming a first channel section adapted to receive said stream, said first channel section having a substantially constant cross section and gradient and having a length which is large relative to the cross sectional dimensions of said channel; walls forming a second channel section as a downstream continuation of said first channel section; a substantially horizontal plate supported in said second channel section submerged in said flowing stream and adapted to separate said stream into an upper stratum and a lower stratum; velocity-reducing regularities on the lower surface of said plate; walls forming a transverse trench in the bottom of said second channel portion under said plate near the downstream end thereof; walls forming in the bottom of said second channel section a passage of increasing cross section for said lower stratum for a substantial distance of the portion upstream from said trench and diminishing cross section area downstream from said trench; walls forming an outlet from said trench and adapted to permit the flushing of sand therefrom; and valve means adapted to control flushing of said trench through said outlet.

11. A combination as described in claim 10 in which said horizontal plate is located at a depth which is in the region at which downstream velocity reaches a value substantially near the maximum.

ELISÉE MONTAGNÉ.

REFERENCES CITED

The following references are of record in the file of this patent:

UNITED STATES PATENTS

| Number | Name | Date |
|---|---|---|
| 1,094,310 | Deal | Apr. 21, 1914 |

FOREIGN PATENTS

| Number | Country | Date |
|---|---|---|
| 50,954 | Austria | 1911 |
| 131,532 | Switzerland | 1929 |
| 417,161 | Germany | 1925 |
| 468,905 | France | 1914 |